United States Patent [19]

Ward et al.

[11] 4,378,291
[45] Mar. 29, 1983

[54] HIGH VOLUME STATIONARY SKIMMER

[75] Inventors: John M. Ward, Katy; Florian C. Demny, Pasadena, both of Tex.

[73] Assignee: Shell Oil Company, Houston, Tex.

[21] Appl. No.: 135,826

[22] Filed: Mar. 31, 1980

[51] Int. Cl.³ .................... B01D 17/00; E02B 15/04
[52] U.S. Cl. .................................. 210/242.3; 210/923
[58] Field of Search ............... 210/83, 242 R, 242 S, 210/DIG. 25, 242.1, 242.2, 242.3, 923

[56] References Cited

U.S. PATENT DOCUMENTS

| 1,644,248 | 10/1927 | Goldman | 210/242 R |
|---|---|---|---|
| 3,707,232 | 12/1972 | Harriyim | 210/242 S |
| 3,745,115 | 7/1973 | Olson | 210/242 |
| 3,810,546 | 5/1974 | Oxenhom | 210/242 |
| 3,814,253 | 6/1974 | Forsbey | 210/242 |
| 3,831,756 | 8/1974 | Bhuta et al. | 210/242 S |

FOREIGN PATENT DOCUMENTS

| 52-34461 | 4/1977 | Japan | 210/242 |
|---|---|---|---|
| 52-45770 | 9/1977 | Japan | 210/242 |

Primary Examiner—Thomas G. Wyse

[57] ABSTRACT

A skimmer is provided for removing oil from the surface of a body of water. The skimmer comprises a funnel-shaped floating weir, a flexible disk suspended thereabove and having an edge contacting the water surface around the weir, suction for removing oil from the bottom of the weir and a vessel for collecting the removed oil.

4 Claims, 3 Drawing Figures

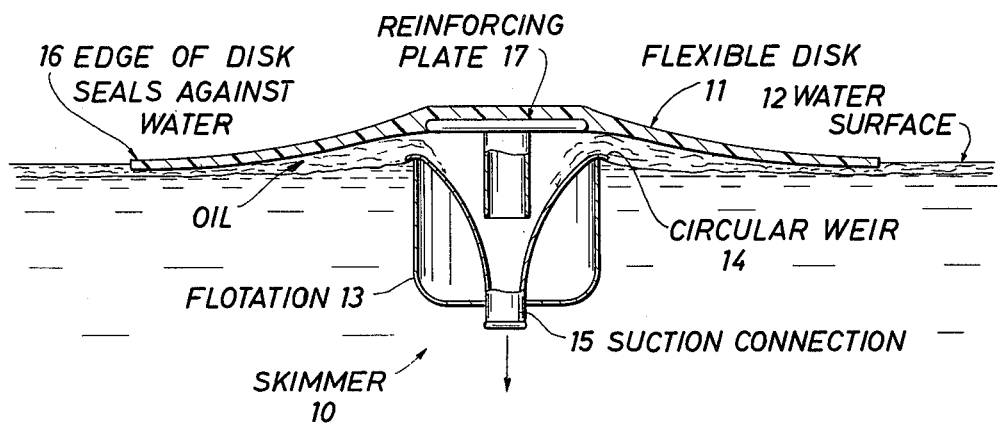
FIG. 1
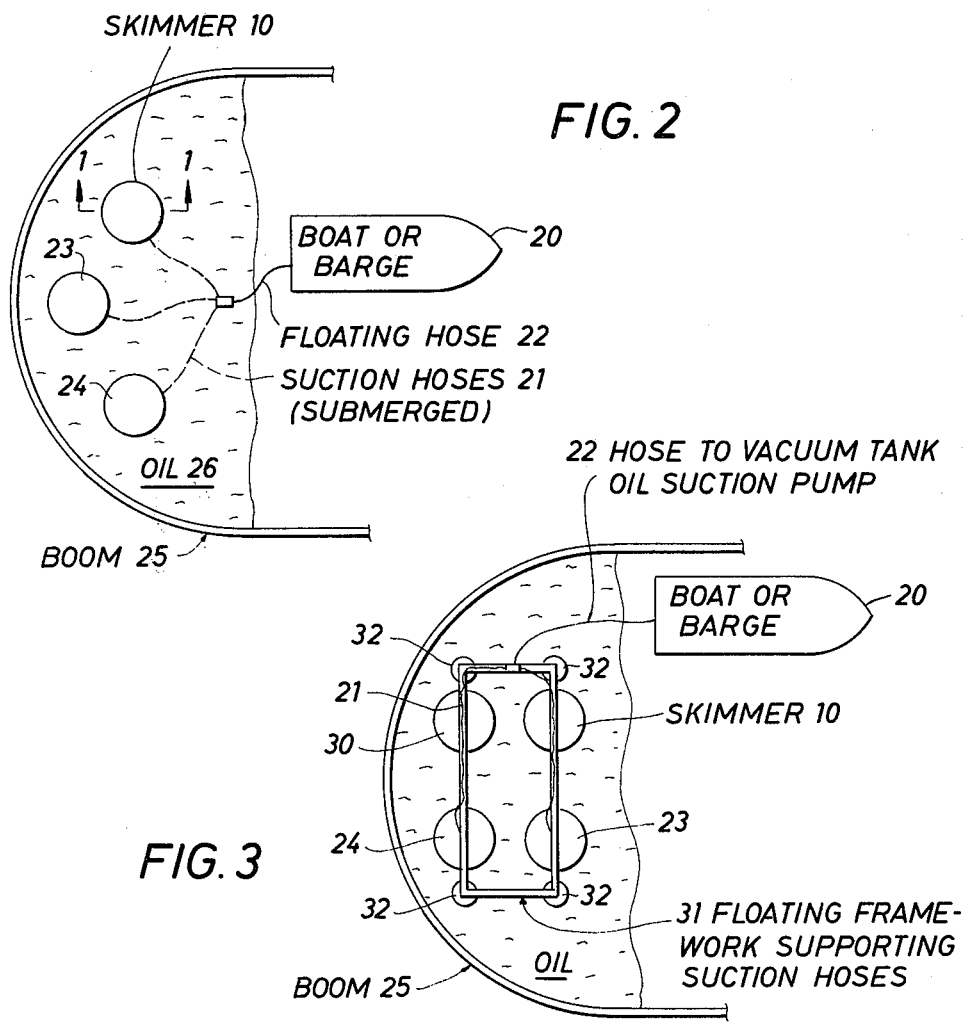
FIG. 2
FIG. 3

HIGH VOLUME STATIONARY SKIMMER

BACKGROUND OF THE INVENTION

Many oil spill skimmers employ weirs to skim a surface layer of oil. Such skimmers frequently are inefficient due to various features of construction. For example, the Manta-Ray Skimmer of Slickbar Corporation is made of sponge rubber and is somewhat flexible but does not prevent air from entering the suction parts and does not provide a means of thickening the oil layer. In the skimmer of U.S. Pat. No. 3,707,232, separation of oil from water is minimal because of the steep slope of the cone, and air entrainment occurs on all but the most calm water because of its rigid nature. U.S. Pat. No. 4,049,554 provides a skimming device intended for use in calm water with relatively thick oil layers in view of the limited flexibility floating pad 220, FIG. 9. U.S. Pat. No. 3,810,546 also provides a weir skimmer which does not provide any means for sealing with the water's edge about the weir.

SUMMARY OF THE INVENTION

The present invention provides an apparatus for removing a pollutant from the surface of a liquid comprising a funnel-shaped weir, means for floating the weir in the liquid, a flexible disk extending above the weir and having an edge contacting the water adjacent the circumference of the weir, means for applying suction to the weir, and means for transporting pollutant from the weir to a pollutant collection means.

Preferably, the invention provides a disk of sponge neoprene of $\frac{1}{8}''$ to $\frac{1}{4}''$ thickness. Even more preferably, the center of the disk is suspended 1 to 4 inches above the still water line and is positioned relative to the weir such that there is a $\frac{1}{4}''$ to $\frac{3}{4}''$ annular opening between the disk and weir. The disk drapes downwardly from its raised center to form an air-tight seal against the water surface.

DESCRIPTION OF THE DRAWINGS

FIG. 1 is a cross section of a skimmer shown in FIG. 2.

FIGS. 2 and 3 disclose two embodiments of deployment schemes using the skimmers of the invention.

DESCRIPTION OF PREFERRED EMBODIMENTS

In accordance with the invention a high volume, stationary skimmer is provided to remove spilled oil or other pollutants from the surface of a body of water. In a typical application, the skimmer or skimmers are deployed to remove oil accumulated in the apex of an oil spill containment boom. The main advantages of the skimmer are (1) it is continuously flexible, allowing good conformance to waves; (2) it is simple, having no moving parts and requiring only connection to a suction hose; and (3) it can be operated to collect mainly oil with little water and no air.

More particularly, as shown in FIG. 1 which provides a cross sectional view of skimmer 10 shown in FIG. 2, the skimmer includes a flexible disk 11 preferably fabricated of a buoyant material such as closed-cell sponge neoprene or similar oil-resistant material and preferably has a thickness of from about $\frac{1}{8}$ to about $\frac{1}{4}$ inches. The center of disk 11 is raised above the still water line 12 by flotation 13 placed below weir 14. Neither the weir, nor the disk need be circular inasmuch as other shapes, for example oval or square, may be suitable for use with the invention. It is generally important that the weir be of a generally funnel-like shape to provide a suction connection 15 at the bottom thereof for removal of pollutant to a boat or barge 20 as shown in FIGS. 2 and 3. The edge 16 of the disk 11 seals against the water which is important since it provides a pocket which oil migrates to by gravitational action and which facilitates the use of suction via connection 15. This sealing effect, coupled with the disk's low density, high flexibility and large waterplane area, allows the disk to follow the surface contours of waves, thereby preventing performance degrading wave reflections and air entrainment. Oil flows up the gentle slope of the disk by gravity forces while the water, being heavier than the oil, moves downwardly. A relatively thick oil layer then accumulates at the peak of the disk which is held up by a reinforcing plate 17 attached in the mouth of weir 14 by supports 18.

As shown in FIGS. 2 and 3, skimmers 10, 23, 24 and 30 are held in position by submerged suction hoses 21 and connected to boat or barge 20 by a floating hose 22. Boom 25 collects oil 26 therewithin for removal by the skimmers to the boat or barge.

Another skimming arrangement is shown in FIG. 3 in which skimmers 20, 23, 24 and 30 are connected via a floating framework 31 supported by flotation means 32. Hoses 21 and 22, boom 25 and boat 20 serve the same functions as in the arrangement of FIG. 2.

What is claimed is:

1. Apparatus for removing a pollutant from the surface of water comprising, a funnel-shaped weir, means for floating the weir in the water, a flexible disk with its center suspended above the weir and above the still water line and having an edge surface contacting the water adjacent but spaced from the circumference of the weir so as to form an airtight seal against the water, said disk being sufficiently flexible to follow the surface contours of waves, thereby preventing performance degrading wave reflections and air entrainment, means for applying suction to the weir, and means for transporting pollutant from the weir to pollutant collection means.

2. The apparatus of claim 1 wherein the disk comprises sponge neoprene of $\frac{1}{8}''$ to $\frac{1}{4}''$ thickness.

3. The apparatus of claim 1 wherein the disk comprises any flexible buoyant material $\frac{1}{8}''$ to $\frac{1}{4}''$ thickness.

4. The apparatus of claim 1 wherein the center of the disk is suspended 1 to 4 inches above the still water line and $\frac{1}{4}$ to $\frac{3}{4}$ inches above the edge of the weir, and drapes downwardly from the center to form an airtight seal against the water.

* * * * *